(12) United States Patent
Jang et al.

(10) Patent No.: US 11,322,118 B2
(45) Date of Patent: May 3, 2022

(54) DISPLAY APPARATUS AND CONTROL METHOD THEREOF

(71) Applicant: SAMSUNG ELECTRONICS CO., LTD., Suwon-si (KR)

(72) Inventors: Jeongrok Jang, Suwon-si (KR); Changkun Park, Suwon-si (KR); Jaehwang Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/934,619

(22) Filed: Jul. 21, 2020

(65) Prior Publication Data

US 2021/0027748 A1 Jan. 28, 2021

(30) Foreign Application Priority Data

Jul. 22, 2019 (KR) .................. 10-2019-0088228

(51) Int. Cl.
*G06T 5/00* (2006.01)
*G09G 5/37* (2006.01)
*G06T 11/00* (2006.01)

(52) U.S. Cl.
CPC .............. *G09G 5/37* (2013.01); *G06T 5/007* (2013.01); *G06T 11/001* (2013.01); *G06T 2207/20081* (2013.01); *G06T 2207/20084* (2013.01)

(58) Field of Classification Search
CPC ......... G09G 5/37; G06T 5/007; G06T 11/001; G06T 2207/20081; G06T 2207/20084; G06T 7/90; G06K 9/62; G06N 3/02; G06N 3/08
See application file for complete search history.

(56) References Cited

U.S. PATENT DOCUMENTS

| 6,573,932 | B1 | 6/2003 | Adams, Jr. et al. |
| 10,535,164 | B2 * | 1/2020 | Shlens ............ G06N 3/04 |
| 2010/0183217 | A1 | 7/2010 | Seung et al. |
| 2016/0100101 | A1 | 4/2016 | Cohen et al. |
| 2016/0364625 | A1 | 12/2016 | Lin et al. |

(Continued)

FOREIGN PATENT DOCUMENTS

| JP | 2006018740 A | 1/2006 |
| JP | 2007036963 A | 2/2007 |

(Continued)

OTHER PUBLICATIONS

International Search Report (PCT/ISA/210) and Written Opinion (PCT/ISA/237) dated Nov. 6, 2020 issued by the International Searching Authority in International Application No. PCT/KR2020/009401.

(Continued)

*Primary Examiner* — Antonio A Caschera
(74) *Attorney, Agent, or Firm* — Sughrue Mion, PLLC

(57) ABSTRACT

A display apparatus includes a display and a processor. The processor is configured to obtain information related to a use environment of the display apparatus, obtain a first image, identify a style among a plurality of styles which are applicable to the first image, based on the information related to the use environment, obtain a second image which is converted from the first image based on information related to the identified style, and control the display to display the second image.

20 Claims, 10 Drawing Sheets

(56) References Cited

U.S. PATENT DOCUMENTS

2017/0139572 A1    5/2017   Sunkavalli et al.
2017/0357518 A1   12/2017   Kozloski et al.
2019/0244060 A1    8/2019   Dundar et al.

FOREIGN PATENT DOCUMENTS

JP     2008269305 A    11/2008
WO   2018111786 A1    6/2018

OTHER PUBLICATIONS

Communication dated Dec. 23, 2020 issued by the European Patent Office in application No. 20186127.5.

\* cited by examiner

FIG. 6

| STYLE | CONTEXT INFORMATION | MODEL DATA | ADDITIONAL EFFECT DATA |
|---|---|---|---|
| | STYLE-AND-MODEL-DB | | |
| STYLE #1 | TIME: NIGHT, SEASON: WINTER, DEVICE POSITION: INDOORS, WEATHER: SNOWY | MODEL #1 | EFFECT #1 |
| STYLE #2 | TIME: NIGHT, SEASON: WINTER, DEVICE POSITION: OUTDOORS, WEATHER: SNOWY | MODEL #2 | EFFECT #2 |
| STYLE #3 | TIME: DAY, SEASON: SUMMER, DEVICE POSITION: OUTDOORS, WEATHER: SUNNY | MODEL #3 | EFFECT #3 |
| STYLE #4 | TIME: DAY, SEASON: AUTUMN, DEVICE POSITION: OUTDOORS, WEATHER: SUNNY | MODEL #4 | EFFECT #4 |
| STYLE #5 | TIME: DAY, SEASON: SUMMER, DEVICE POSITION: OUTDOORS, WEATHER: RAINY | MODEL #5 | EFFECT #5 |
| ... | ... | ... | ... |

SELECTION AND APPLICATION OF MODEL

SECOND CONTEXT INFORMATION

INPUT IMAGE

OUTPUT IMAGE

DISPLAY APPARATUS AND CONTROL METHOD THEREOF

CROSS-REFERENCE TO RELATED THE APPLICATION(S)

This application is based on and claims priority under 35 U.S.C. § 119 to Korean Patent Application No. 10-2019-0088228 filed on Jul. 22, 2019 in the Korean Intellectual Property Office, the disclosure of which is incorporated by reference herein in its entirety.

BACKGROUND

1. Field

The disclosure relates to a display apparatus that processes an image or the like visual content and a control method thereof, and more particularly to a display apparatus, which generates a new image by transferring a style of an input image, and a control method thereof.

2. Description of the Related Art

To compute and process predetermined information in accordance with certain processes, an electronic apparatus includes a central processing unit (CPU), a chipset, a memory, and the like electronic components for the computation. Such an electronic apparatus may be variously classified in accordance with what information will be processed and what it is used for. For example, the electronic apparatus is classified into an information processing apparatus such as a personal computer (PC), a server or the like for processing general information; an image processing apparatus for processing image data; an audio apparatus for audio processing; home appliances for miscellaneous household chores; etc. The image processing apparatus may be embodied by a display apparatus that displays an image based on processed image data on the display panel.

The display apparatus displays a moving image, a still image and the like content, and also may provide a service of transferring the corresponding content by reflecting various functions required by a user to the corresponding content. An example of such service is a style transfer. The style transfer is a method of transferring the style of the input image while keeping the content of the input image.

The related art display apparatus displays a list of various styles applicable to the input image, and identifies one or more styles selected by a user on the list.

A related art method of style transfer allows a user to directly select the style. To identify which style among various styles provided by the display apparatus is optimized to or best matching with an input image, a user needs to select many styles one by one to be individually applied to the input image, and visually see and compare the output images based on the respective styles in person. Such operations might be difficult, time consuming, and cumbersome.

Alternatively, a specific service or application of supporting the style transfer may provide a basic transfer scenario. However, such a basic transfer scenario may result in reflecting an unoptimized or mismatched style to an input image because the input image is converted by one fixed method unless otherwise intervened by a user.

SUMMARY

Provided are apparatuses and methods providing a style transfer service that possesses models corresponding to various styles to provide a style optimized to an input image while minimizing a user intervention, thereby automatically providing the best output image to a user.

Additional aspects will be set forth in part in the description which follows and, in part, will be apparent from the description, or may be learned by practice of the presented embodiments.

In accordance with an aspect of the disclosure, there is provided a display apparatus including: a display; and a processor configured to obtain information about a use environment of the display apparatus, obtain a first image, identify a style among a plurality of styles which are applicable to the first image, based on the information about the use environment, obtain a second image converted from the first image based on information about the identified style, and control the display to display the obtained second image.

The information about the identified style may include an artificial neural network model based on deep learning.

The processor may convert the first image based on a model corresponding to the identified style among a plurality of models respectively corresponding to the plurality of styles.

The information about the use environment may include information about at least one of a use time, a use place, a use history, or a surrounding environment of the display apparatus.

The processor may process the information about the use environment based on a look-up table in which attribute values are defined corresponding to a plurality of attribute items about the use environment of the display apparatus.

The processor may be configured to: identify a first style based on the information about the use environment among the plurality of styles, identify a second style based on information about attributes of the first image, and convert the first image based on information about the first style and information about the second style.

The processor may be configured to process the information about the attributes of the first image based on a look-up table in which attribute values are defined corresponding to a plurality of attribute items about an image.

The information about the attributes of the first image may include information about an object in the first image.

The display apparatus may further include a communication circuit configured to communicate with a server, wherein the processor may transmit information about the first image to the server through the communication circuit, and obtain information about the second image converted by the server from the server through the communication circuit.

The style may include at least one of hue, saturation, brightness and contrast of the first image, an edge type for an object in the first image, or a texture type applied to the object.

In accordance with an aspect of the disclosure, there is provided a method of controlling a display apparatus, including: obtaining information about a use environment of the display apparatus; obtaining a first image; identifying a style among a plurality of styles which are applicable to the first image, based on the information about the use environment; obtaining a second image converted from the first image based on information about the identified style; and displaying the obtained second image.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 illustrates a database (DB) of styles and models to be referred to by an electronic apparatus according to an embodiment;

DETAILED DESCRIPTION

Below, embodiments will be described in detail with reference to accompanying drawings. Further, embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements used herein represents all of the elements and also each one of the elements, which excludes the other elements or all combinations of the elements.

As used herein, the terms "1st" or "first" and "2nd" or "second" may use corresponding components regardless of importance or order and are used to distinguish one component from another without limiting the components.

The style transfer refers to a function that applies a style designated by a user to an input image to convert the input image and generate a new output image. The style transfer is a method of transferring the style of the input image while keeping the content of the input image. There may be various methods of transferring the style of the input image, and one example may be a modeling method based on machine-earning or deep-learning of artificial intelligence (AI).

The display apparatus is configured to possess or access convolutional neural network (CNN)-based models corresponding to various styles. The display apparatus displays a list of various styles applicable to the input image, and identifies one or more styles selected by a user on the list. The display apparatus obtains a model corresponding to one or more identified style, and converts an input image into an output image by the obtained model. The output image has the content of the input image in the style of the obtained model.

Figure 1:
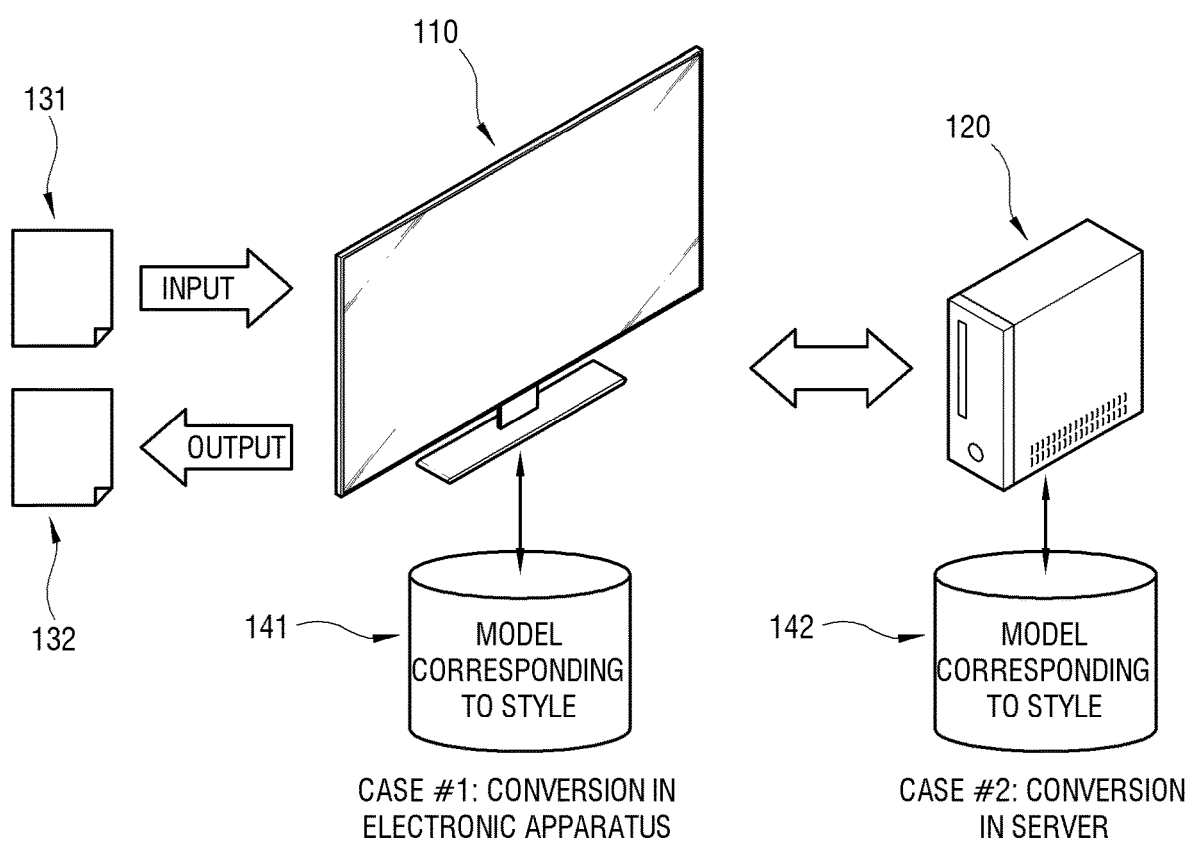
FIG. 1 illustrates some examples of providing a processing service for an input image input to an electronic apparatus according to an embodiment.

FIG. 1 illustrates examples of providing a processing service for an input image input to an electronic apparatus.

As shown in FIG. 1, the electronic apparatus 110 according to an embodiment is embodied by a display apparatus capable of displaying an image. When the electronic apparatus 110 is embodied by the display apparatus, the electronic apparatus 110 includes a television (TV), a computer, a tablet computer, a portable media player, a wearable device, other mobile devices, etc. However, the electronic apparatus 110 may be embodied by various kinds of apparatuses such as an image processing apparatus, home appliances, an information processing apparatus, etc. In an embodiment, the electronic apparatus 110 is embodied by the display apparatus capable of autonomously displaying an input image 131 and an output image 132.

The electronic apparatus 110 provides a style transfer service for the input image 131 to a user by itself or together with a server 120 capable of communicating with the electronic apparatus 110. The style transfer service may for example be provided through a predetermined application operating in the electronic apparatus 110.

The style transfer service refers to a service that transfers the style of the input image 131 to generate the output image 132. The input image 131 is formed as various objects to be represented are visually represented according to the style. The style may be set based on a technique or the like by which an object is represented in an image. When the input image 131 shows a street at midday, the street, buildings surrounding the street, people on the street, etc. in the input image 131 are regarded as objects to be represented. Further, high quantity of sunlight giving an impression of the midday, a yellowish impression of the sunlight, etc. in the input image 131 are regarded as styles.

Here, it will be assumed that a style corresponding to night instead of the style corresponding to the midday is applied to the input image 131. The style corresponding to the night may for example be achieved by low quantity of light giving an overall dark impression, a black-based color impression, a contrast emphasis between a light source for emitting light and its surroundings, etc. When the style corresponding to the night is applied to the input image 131 without changing many objects of the input image 131, the input image 131 is converted to the output image 132 showing the street at night. Further, by adding a visual effect of snow flurries to the sky in the input image 131, the input image 131 taken in summer may be converted into the output image 132 giving an impression of winter. In other words, the same objects are represented in different styles so that the output image 132 can give various impressions of the input image 131 to a user.

The style transfer service transfers the style of representing the input image 131, thereby providing the output image 132, which includes the objects of the input image 131 but is different in style from the input image 131, to a user. The style may include various detailed items, for example, the hue, saturation, brightness and contrast of the input image 131, the kinds of edge or outline for the object, the kinds of texture applied to the object, etc.

There are many methods of converting the style of the input image 131 into a selected style, and one example may be a converting method of using a deep-learning based convolutional neural network (CNN) model, but an embodiment is not limited to this example. For example, the electronic apparatus 110 or the server 120 is configured to store DB 141 and 142 containing a plurality of models respectively corresponding to a plurality of styles. For example, a plurality of models of DB 141 may be the same as a plurality of models of DB 142, or may be different. The model corresponding to the style is based on the CNN model. When one or more styles are selected under a preset condition, the model corresponding to the selected style is identified from the DBs 141 and 142, and the style of the input image 131 is transferred by the identified model.

According to whether the model corresponding to the style is stored in the DB 141 or the DB 142, the electronic apparatus 110 may for example be used to transfer the style of the input image 131 or the server 120 may for example be used to transfer the style of the input image 131. However, an embodiment is not limited to these examples, and another external apparatus may be used.

For example, when the electronic apparatus 110 obtains the input image 131, the electronic apparatus 110 identifies the model corresponding to the style based on a predetermined condition from the DB 141, and converts the input image 131 into the output image 132 by the identified model. The electronic apparatus 110 may store or display the converted output image 132 to be provided to a user.

For example, when the electronic apparatus 110 obtains the input image 131, the electronic apparatus 110 transmits the obtained input image 131 to the server 120 through a network. The server 120 identifies the model corresponding to the style based on a predetermined condition from the DB 142, converts the input image 131 into the output image 132 by the identified model, and transmits the output image 132 to the electronic apparatus 110. The electronic apparatus 110 provides the received output image 132 to a user. In an embodiment, description is based on the electronic apparatus 110 transferring the style of the input image 131. The case of using the server 120 is equivalent to the case of using the electronic apparatus 110, and therefore detailed descriptions thereof will be omitted.

Figure 2:
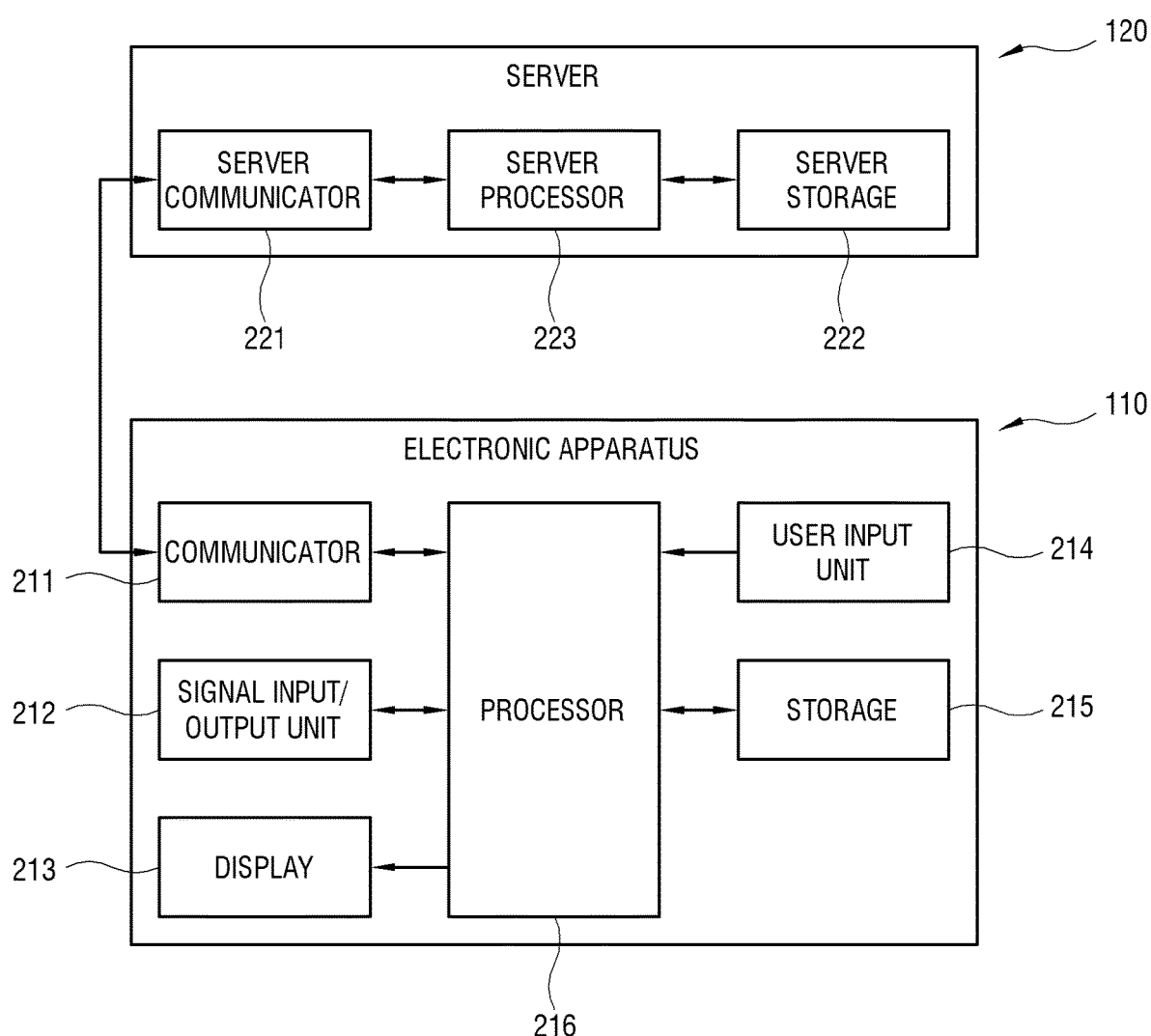
FIG. 2 is a block diagram of an electronic apparatus according to an embodiment.

As shown in FIG. 2, an electronic apparatus 110 includes a communicator 211, e.g., a communication circuit or a communication interface, a signal input/output unit 212, a display 213, a user input unit 214, a storage 215, and a processor 216. A server 120 includes a server communicator 221, e.g., a communication circuit or a communication interface, a server storage 222, and a server processor 223.

In an embodiment described below, the electronic apparatus 110 is a display apparatus. However, the electronic apparatus 110 may be embodied by various kinds of apparatuses, and therefore the configuration of the electronic apparatus 110 is not limited to an embodiment. The electronic apparatus 110 might not be embodied by the display apparatus, and the electronic apparatus 110 in this case might not include elements for displaying an image like the display 213.

The communicator 211 refers to an interactive communication circuit that includes at least one of elements, such as a communication module, a communication chip, etc. corresponding to various wired and wireless communication protocols. For example, the communicator 211 may be embodied by a wireless communication module that performs wireless communication with an access point (AP) based on Wi-Fi, or a local area network (LAN) card connected to a router or a gateway by a wire. For example, the communicator 211 communicates with a server 120 on a network thereby transmitting and receiving a data packet to and from the server 120.

The signal input/output unit 212 is one-to-one or one-to-many connected to an external apparatus such as a set-top box or an optical media player by a cable, thereby receiving or outputting data from and to the corresponding external apparatus. The signal input/output unit 212 may for example include a high definition multimedia interface (HDMI) port, a display port, a universal serial bus (USB) port, and the like connectors or ports according to preset transmission standards.

The display 213 includes a display panel capable of displaying an image on a screen. The display panel is provided to have a light receiving structure such as a liquid crystal type, or a self-emissive structure such as an organic light emitting diode (OLED). The display 213 may include an additional element according to the structures of the display panel. For example, when the display panel is the liquid crystal type, the display 213 includes a liquid crystal display panel, a backlight unit configured to emit light, and a panel driving substrate configured to drive liquid crystal of the liquid crystal display panel.

The user input unit 214 includes circuitry related to various input interfaces provided to be controlled by a user to make an input. The user input unit 214 may be variously configured according to the kinds of electronic apparatus 110, and may for example include a mechanical or electronic button of the electronic apparatus 110, a remote controller separated from the electronic apparatus 110, a touch pad, a touch screen installed in the display 213, etc.

The storage 215 is accessed by the processor 216, and performs operations such as reading, recording, modifying, deleting, updating, etc. for data under control of the processor 216. The storage 215 includes a nonvolatile memory such as a flash memory, a hard disc drive (HDD), a solid state drive (SSD), a read only memory (ROM), and the like that retains data regardless of whether power is turned on or off; and a volatile memory such as a buffer, a random access memory (RAM) and the like to which data for processes is loaded. The storage 215 is configured to store an operating system, various applications provided to run on the operating system, and a model for transferring a style of an image.

The processor 216 includes one or more hardware processors achieved by a CPU, a chipset, a buffer, a circuit, etc. which are mounted on a printed circuit board (PCB). For example, the processor 216 may be designed as a system on chip (SoC). The processor 216 includes modules corresponding to various processes, such as a demultiplexer, a decoder, a scaler, an audio digital signal processor (DSP), an amplifier, etc. when the electronic apparatus 110 is embodied by a display apparatus. Among such modules, some or all of the modules may be achieved by the SoC. For example, a demultipexer, a decoder, a scaler, and the like module related to an image process may be achieved as an image processing SoC, and an audio DSP may be achieved as a chipset separated from the SoC.

When the processor 216 obtains an input image from the communicator 211, the signal input/output unit 212, the storage 215, etc., the processor 216 performs a style transfer process for the input image based on the model stored in the storage 215 or prepared in the server 120.

The server communicator 221 is an interactive communication circuit that includes at least one of elements, such as a communication module, a communication chip, etc. corresponding to various wired and wireless communication protocols. The server communicator 221 is connected to a wide area network and communicates with various kinds of clients such as the electronic apparatus 110 through the network.

The server storage 222 performs operations such as reading, recording, modifying, deleting, updating, etc. for data under control of the server processor 223. The server storage 222 may include various nonvolatile and volatile memories such as a flash memory, an HDD, an SSD, a buffer, a RAM, etc. When the server 120 is provided to transfer the style of the image, the server storage 222 may be configured to store the model for transferring the style.

The server processor 223 includes one or more hardware processors achieved by a CPU, a chipset, a buffer, a circuit, etc. which are mounted on a PCB, and may be designed as an SoC. The server processor 223 may perform various processes based on information received from the electronic apparatus 110. For example, in the case where the server 120 is provided to transfer the style of the image, when the input image is received from the electronic apparatus 110 through the server communicator 221, the server processor 223 performs the style transfer process for the input image based on the model stored in the server storage 222.

Figure 3:
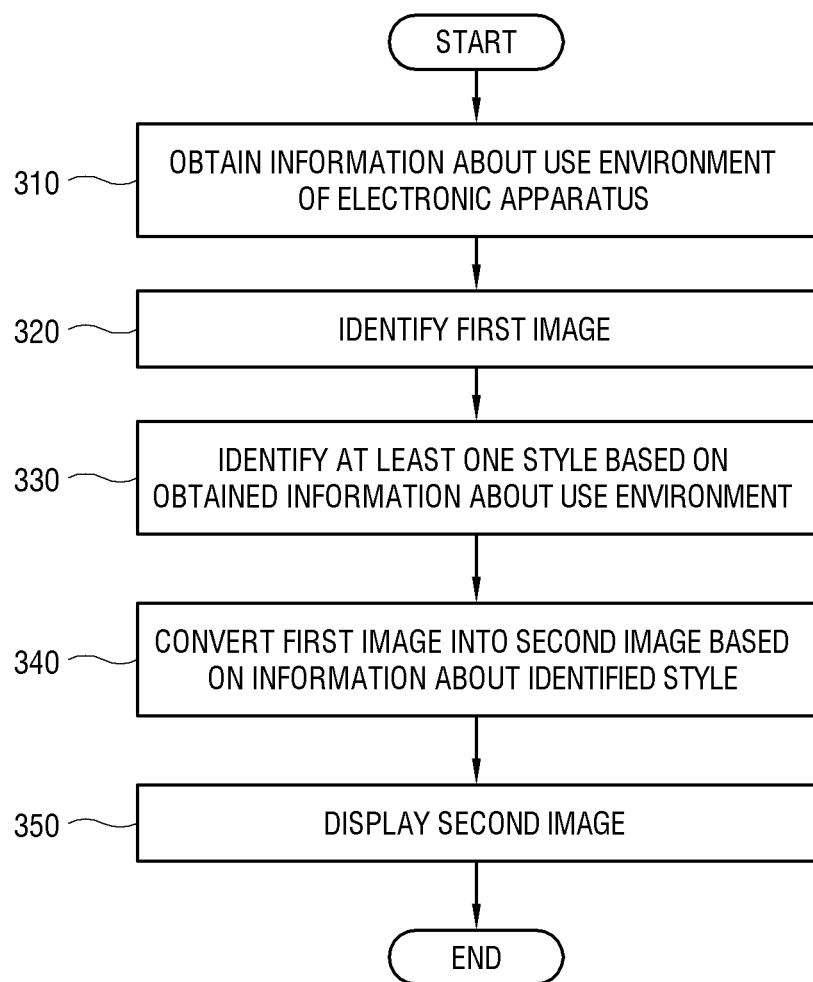
FIG. 3 is a flowchart of a style transfer method performed in an electronic apparatus according to an embodiment.

FIG. 3 is a flowchart of a style transfer method performed in an electronic apparatus.

As shown in FIG. 3, the following operations are carried out by the processor of the electronic apparatus.

At operation 310 the electronic apparatus obtains information about a use environment of the electronic apparatus. The use environment of the electronic apparatus may include many items, for example, a current time, a use area of the electronic apparatus, a use history of the electronic apparatus, device information about the electronic apparatus, etc. The use environment in an embodiment is not restricted to a neighboring environment of the electronic apparatus. The use environment in an embodiment is related to intrinsic environments and/or parameters such as the electronic apparatus's own attributes and extrinsic environments and/or parameters such as the date, season, place, local area, communication conditions, etc., of using the electronic apparatus.

At operation 320, the electronic apparatus identifies a first image. The first image may be identified based on a user input. The first image may be selected among a plurality of images previously stored in the electronic apparatus based on a user input, or may be received from an external apparatus. When an application related to an image conversion process is running on the electronic apparatus, the first image may be identified through the running application.

At operation 330 the electronic apparatus identifies at least one style based on obtained information about the use environment, among a plurality of styles applicable to the first image.

At operation 340 the electronic apparatus converts the first image into a second image based on the information about the identified style. Here, when the conversion method is a style transfer method based on deep learning, the information about the identified style may for example be a CNN model corresponding to the corresponding style.

At operation 350 the electronic apparatus displays the second image to be provided to a user.

The electronic apparatus automatically selects the style, which matches the use environment of the electronic apparatus, in terms of generating the second image by transferring the style of the first image. Therefore, the electronic apparatus can provide the second image of the optimized style to a user even without the user's input for selecting the style.

Figure 4:
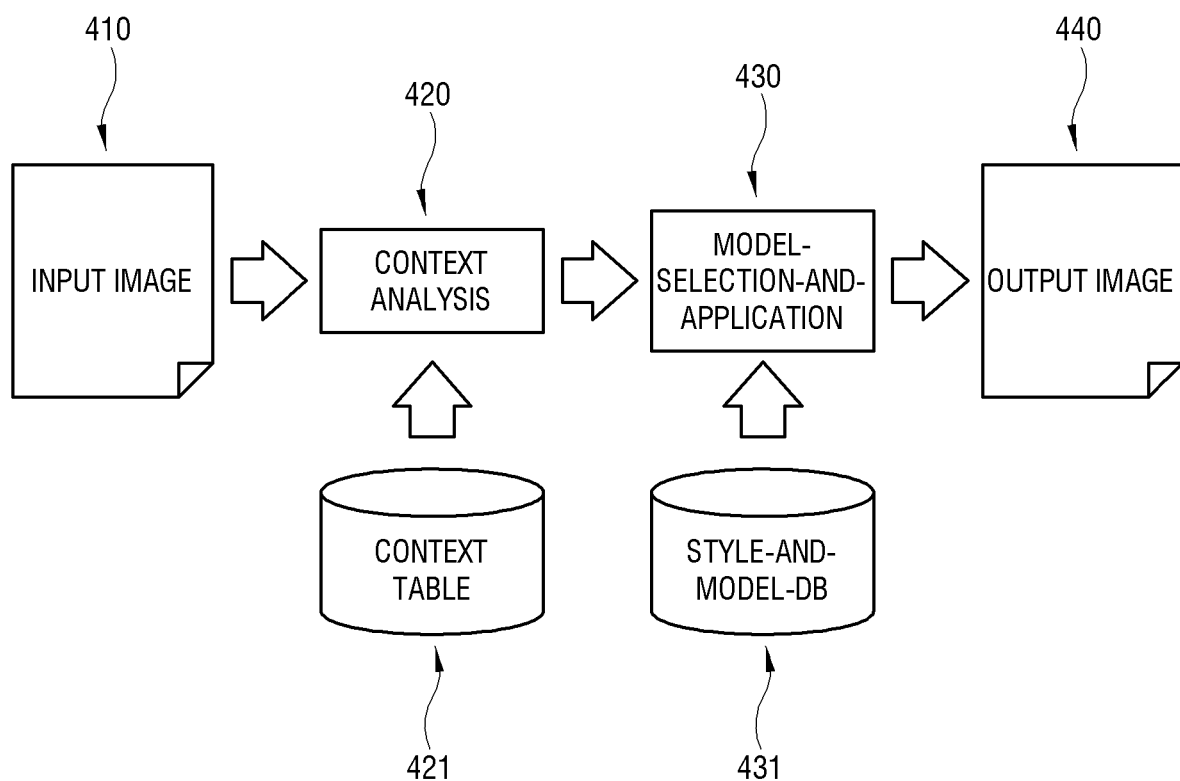
FIG. 4 illustrates schematic operations in a style transfer process performed by an electronic apparatus according to an embodiment.

FIG. 4 illustrates schematic operations in a style transfer process performed by an electronic apparatus.

As shown in FIG. 4, when the input image 410 is identified, the electronic apparatus performs a context analysis 420 for analyzing and filtering context information corresponding to a current point in time. When the context information corresponding to the input image 410 is obtained based on the context analysis 420, the electronic apparatus performs model-selection-and-application 430 corresponding to the obtained context information. By the model-selection-and-application 430, the electronic apparatus finally obtains an output image 440. The context analysis 420 corresponds to the operation 330 of FIG. 3, and the model-selection-and-application 430 includes identification of style corresponding to the operation 330 of FIG. 3 and identification and application of the model corresponding to the operation 340 of FIG. 3.

The first obtained context information includes various pieces of information related to the use environment of the electronic apparatus at the current point in time. The first obtained context information may include information about the style transfer process and irrelevant information. Further, even though the context information is related to the style transfer process, this information might not be formalized to be used in the style transfer process. The context analysis 420 of the electronic apparatus performs a task for normalizing necessary information while excluding unnecessary information from the first obtained context information, by using a previously prepared context table 421.

The electronic apparatus calls a previously stored context table 421 in response to the obtainment of the input image 410. In the context table 421, a plurality of attribute items related to the use environment of the electronic apparatus, and a plurality of attribute values respectively corresponding to the attributes are tabulated. The context table 421 may for example be a look-up table. The context table 421 may be obtained when the electronic apparatus is manufactured, or may be received and updated from a server.

In the context analysis 420, the electronic apparatus obtains various pieces of first context information corresponding to the current point in time, and converts the first context information into the second context information corresponding to the input image 410 based on the context table 421.

When the second context information is obtained, the electronic apparatus uses a style-and-model-DB 431 to identify a style and a model corresponding to the second context information. The style-and-model-DB 431 is configured to store data about styles respectively corresponding to a plurality of pieces of context information, and models for realizing the corresponding styles.

The electronic apparatus uses the identified model corresponding to the style to transfer the style of the input image 410, thereby generating the output image 440.

In the above-described embodiment, all of the processes are carried out by the electronic apparatus, but some processes may be carried out by the server.

For example, the server is configured to store the context table 421 and the style-and-model-DB 431, and perform the context analysis 420 and the model-selection-and-application 430. In this case, the electronic apparatus transmits the input image 410 to the server when the input image 410 is identified. In an embodiment, the server performs the context analysis 420 and the model-selection-and-application 430 to convert the input image 410 into the output image 440, and transmits the output image 440 to the electronic apparatus. Thus, the electronic apparatus obtains the output image 440.

Alternatively, the server may be provided to perform only one process between the context analysis 420 and the model-selection-and-application 430. The electronic apparatus transmits a result of an ongoing process to the server, and receives a result of a process performed in the server from the server.

Figure 5:
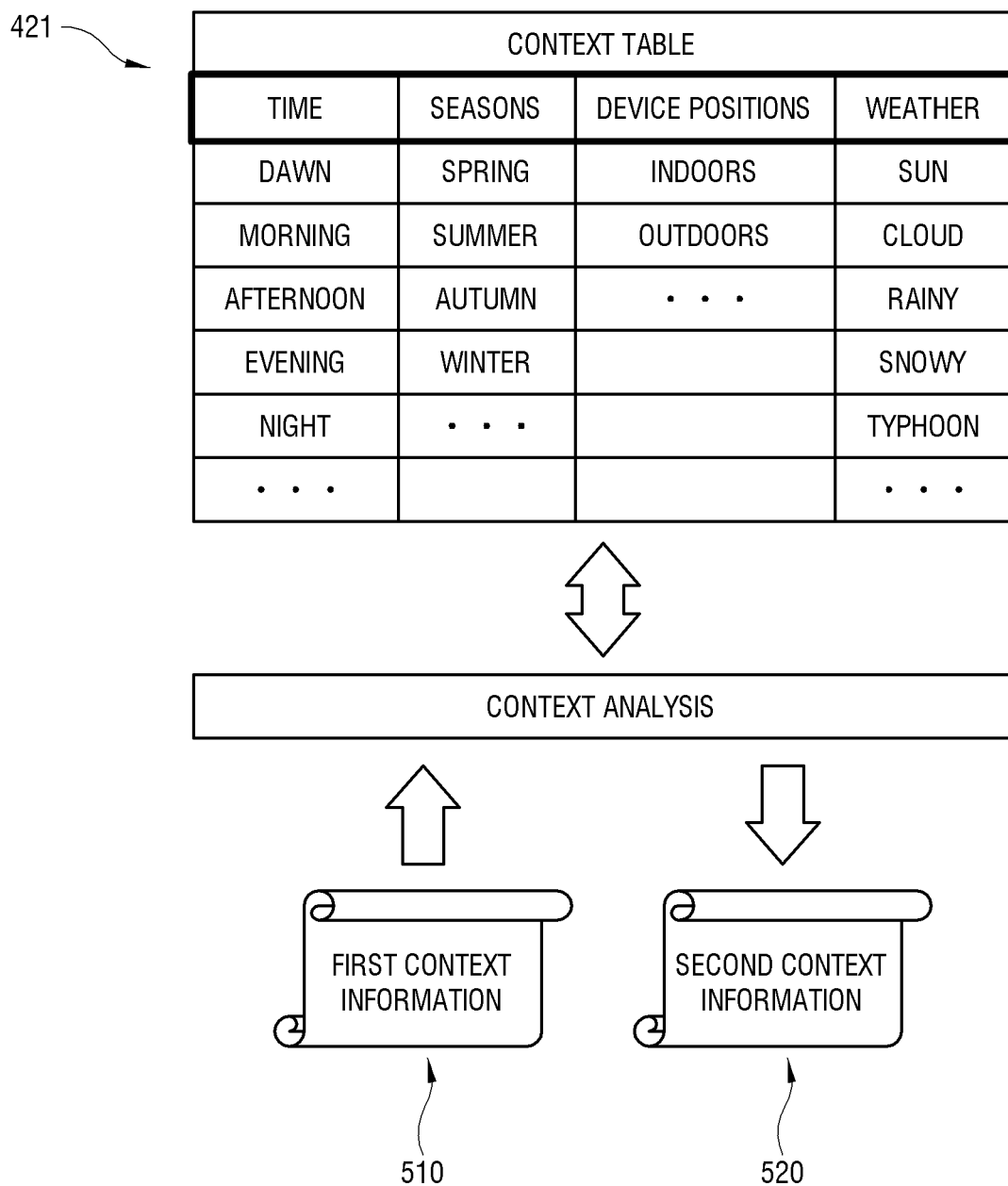
FIG. 5 illustrates a context table to be referred to by an electronic apparatus according to an embodiment.

FIG. 5 illustrates a context table to be referred to by an electronic apparatus.

As shown in FIG. 5, when first context information 510 is obtained, the electronic apparatus uses a context table 421 to perform a context analysis for obtaining the second context information from the first context information 510.

The electronic apparatus may obtain the first context information 510 from its own elements or from the server or another external apparatus. The first context information 510 may include information of various categories. Examples of such categories are time attributes such as time, dates, seasons, etc., place attributes such as installation positions or places, areas, countries, etc., of the electronic apparatus; user attributes such as a user account, a use history, etc., of the electronic apparatus; and surrounding environment attributes of the electronic apparatus such as current weather, ambient brightness, etc.

For example, the electronic apparatus may identify the installation area or country of the electronic apparatus based on network information such as Internet protocol (IP) address, etc. for communication connection with a network. The electronic apparatus may identify the current date, year, season, etc. based on time information obtained from the server or from its own clock. The electronic apparatus may identify the current temperature based on an Internet of Things (IoT). The electronic apparatus may identify the ambient brightness from a brightness sensor. The electronic apparatus may identify the current weather from a weather management server. The foregoing examples are merely some of instances, and the first context information 510 includes various pieces of unrestricted information related to the use environment of the electronic apparatus.

In the context table 421, a plurality of attribute items and attribute values of attribute items are tabulated. In an embodiment, the context table 421 shows only very few data as compared with actual one, to shorten the description of an embodiment. For example, the context table 421 may include attribute items such as time, seasons, device positions, weather, etc. For example, the attribute item "time" has attribute values dawn, morning, afternoon, evening, night, etc., and the attribute item "seasons" has attribute values spring, summer, autumn, winter, etc. In this manner, each attribute item may be assigned a plurality of attribute values.

The electronic apparatus analyzes whether information corresponding to each attribute of the context table 421 is present in the first context information 510, and identifies the attribute values of the attribute items based on analysis results. For example, the first context information 510 may show that the current time obtained from an electronic clock among the IoT devices communicating with the electronic apparatus is night, the current season information obtained from the server is winter, a device position obtained from a closed circuit (CC) TV among the IoT devices communicating with the electronic apparatus is indoors, and weather information obtained from the server indicates a snowy day.

The electronic apparatus generates second context information 520 based on the identified attribute values of the attribute items. For example, the electronic apparatus may obtain the second context information 520 having content of "time: night, season: winter, device position: indoors, and weather: snow" based on the first context information 510. Such second context information 520 is merely an example, and an embodiment is not limited thereto.

In an example described below, the electronic apparatus selects a style and a model corresponding to the second context information 520.

FIG. 6 illustrates a DB of styles and models to be referred to by an electronic apparatus.

As shown in FIG. 6, a style-and-model-DB 431 is configured to store a plurality of styles respectively corresponding to a plurality of pieces of context information, and model data corresponding to the styles. The style-and-model-DB 431 may be configured to additionally store additional effect data corresponding to each style. The additional effect data corresponding to the style is not essential, and the additional effect data might not be prepared according to the styles.

The electronic apparatus identifies the style corresponding to second context information 520 from the style-and-model-DB 431, and obtains the model data and the additional effect data corresponding to the identified style. The electronic apparatus converts an input image 610 into an output image 620 based on the obtained model data, or the obtained model data and additional effect data.

The model data may be an AI model previously generated by learning, which is designed to be optimized to context information. For example, it will be taken into account that the context information corresponding to the style #2 shows "time: night, season: winter, device position: outdoors, and weather: snow". Because sunlight is absent in a predetermined place corresponding to an indoor position and night time, the sky or the like except an artificial light source has an overall darkish color. Because the artificial light source is relatively bright but its surroundings are suddenly dark, a surrounding contrast of the artificial light source will be emphasized. The model #2 is designed to represent the foregoing feeling in a predetermined image.

The additional effect data reflects various visual effects on an image separately from the model data. For example, snow flurries are expected in a place corresponding to a winter season and snowy weather. The effect #2 corresponding to the style #2 gives an effect of snow flurries to the whole image or some objects within the image, to which the model data is reflected.

For example, context information corresponding to the style #4 shows "time: day, season: autumn, device position: outdoors, and weather: sunny". When a place corresponds to an outdoor position, daytime and sunny weather, this place has high quantity of light due to sunlight and is overall bright. Further, when the season is autumn and the place is outdoors, the sky in this place will be prominently blue. The model #4 is designed to represent such a feeling in a predetermined image.

The method of designing and realizing the model corresponding to the style is based on an AI-based learning model. The model data may for example be embodied by a deep-learning based CNN model. For example, input data of an artificial neural network configured with only a fully connected layer is restricted to one-dimensional (1D) form. A color picture has three-dimensional (3D) data. When picture data is used in learning of a fully connected neural network (FCNN), 3D picture data needs to be planarized into 1D. In the process of planarizing the picture data, it is impossible to avoid loss of spatial information of an image, and thus the loss of the spatial information causes a lack of information. Therefore, it is inefficient for an artificial neural network to extract and learn features, and there is a limit to enhancement of accuracy. The CNN is a model in which learning is possible while keeping the spatial information of the image.

As compared with the FCNN, the CNN is characterized in keeping a format of input/output data of each layer, effectively recognizing features of neighboring images while keeping spatial information of an image, using a plurality of filters to extract and learn the features of the image, using a pooling layer to collect and enhance the extracted features of the image, and learning relatively fewer parameters because the filter is used as a sharing parameter.

The CNN is divided into extraction of features from an image and classification of classes. A feature extracting area is configured by stacking up a convolution layer and a pooling layer over and over. The convolution layer is essential to reflect an activation function after applying a filter to input data. The pooling layer following the convolution layer is a selective layer. In the last of the CNN, the fully connected layer is added for the classification of the image. Between the extraction of the features from the image and the classification of the image, a flatten layer is provided to convert data from an image format into an array format.

In the CNN, the filter is convolved with input data to extract the image features, and a result of convolution operation is used to form a feature map. The convolution layer is varied in a shape of output data depending on a filter size, a stride, whether or not padding is applied, and a max pooling size.

The style transfer process may be a process that converts an input image by a model based on the above-described principle, so that the style of the model can be newly reflected to the input image instead of the original style of the input image.

The electronic apparatus according to an embodiment employs the style-and-model-DB 431 to automatically select a model matching the input image 610, and generate the output image 620 based on the selected model.

In the described-above embodiment, the electronic apparatus uses the model matching the context information about the use environment of the electronic apparatus. However, a criterion for selecting the model to be used by the electronic apparatus is not limited only to the use environment of the electronic apparatus. As described in detail below, the electronic apparatus generates the output image by considering both the use environment of the electronic apparatus and the attributes of the input image.

Figure 7:
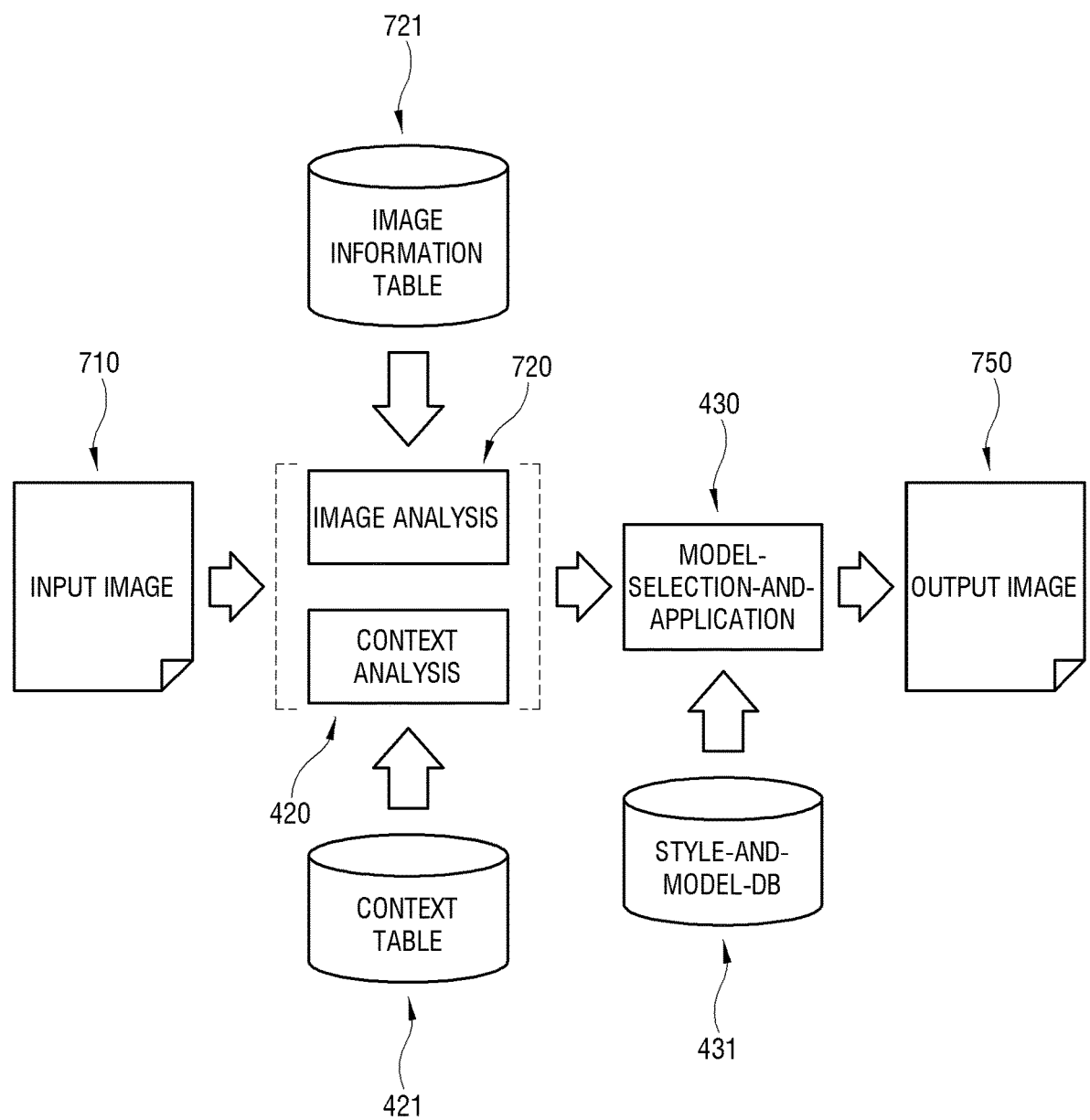
FIG. 7 illustrates schematic operations in a style transfer process of an electronic apparatus taking attributes of an input image and a use environment of an electronic apparatus into account according to an embodiment.

FIG. 7 illustrates schematic operations in a style transfer process of an electronic apparatus taking attributes of an input image and a use environment of an electronic apparatus into account.

As shown in FIG. 7, when an input image 710 is identified, the electronic apparatus performs an image analysis 720 for analyzing image information corresponding to the attributes of the input image 710, and a context analysis 420 for analyzing and filtering context information corresponding to a current point in time. The electronic apparatus finally obtains an output image 750 through a model-selection-and-application 430. When the image information and the context information are distinguished from each other, the image information includes information about the input image 710, and the context information includes information about the use environment except the input image 710.

The operations up to the operation of identifying the style in the image analysis 720 and the context analysis 420 and in the model-selection-and-application 430 are equivalent to the operation 330 of FIG. 3. The operations of identifying and applying the model in the model-selection-and-application 430 are equivalent to the operation 340 of FIG. 3.

A method of the electronic apparatus in an embodiment using a context table 421 to perform the context analysis 420 is substantially the same as described above, and thus detailed descriptions thereof will be omitted.

The electronic apparatus according to an embodiment uses an image information table 721 to additionally perform the image analysis 720. In the image information table 721, items related to a plurality of image attributes and a plurality of attribute values of the items are tabulated. The image information table 721 may for example be provided as a look-up table. The image information table 721 may be provided when the electronic apparatus is manufactured, or updated as received from the server.

The electronic apparatus analyzes content forming the input image 710 in the image analysis 720. The electronic apparatus uses the image information table 721 to obtain image information about content attributes of the input image 710.

In an embodiment, a style-and-model-DB 431 includes styles and models corresponding to the context information, and styles and models corresponding to the image information. The electronic apparatus may identify a first style corresponding to the image information and a second style corresponding to the context information from the style-and-model-DB 431 in the model-selection-and-application 430. The electronic apparatus obtains the first model corresponding to the first style and the second model corresponding to the second style from the style-and-model-DB 431.

The electronic apparatus applies the obtained first and second models to the input image 710, thereby generating the output image 750. Here, there are no limits to order in which the first model and the second model are applied to the input image 710. For example, the electronic apparatus converts the input image 710 based on the first model. The converted input image 710 reflects the first style based on the first model. Then, the electronic apparatus allows the input image 710, to which the first style is reflected, to be converted again based on the second model, and additionally reflect the second style based on the second model. Thus, the input image 710 is finally converted into the output image 750 to which the first style and the second style are reflected. The first model is not necessarily applied prior to the second model, but the second model may be applied prior to the first model.

In the described-above embodiment, all of the processes are carried out by the electronic apparatus, but some processes may be performed by the server.

For example, the server is configured to store the image information table 721, the context table 421 and the style-and-model-DB 431 and perform the image analysis 720, the context analysis 420 and the model-selection-and-application 430. When the input image 710 is identified, the electronic apparatus transmits the identified input image 710 to the server. In an embodiment, the server may perform the image analysis 720, the context analysis 420 and the model-selection-and-application 430 to convert the input image 710 into the output image 750, and transmit the output image 750 to the electronic apparatus. Thus, the electronic apparatus obtains the output image 750.

Alternatively, the server may be provided to perform only some processes among the image analysis 720, the context analysis 420 and the model-selection-and-application 430. The electronic apparatus may transmit a result of an ongoing process to the server, and receive a result of a process performed in the server.

Figure 8:
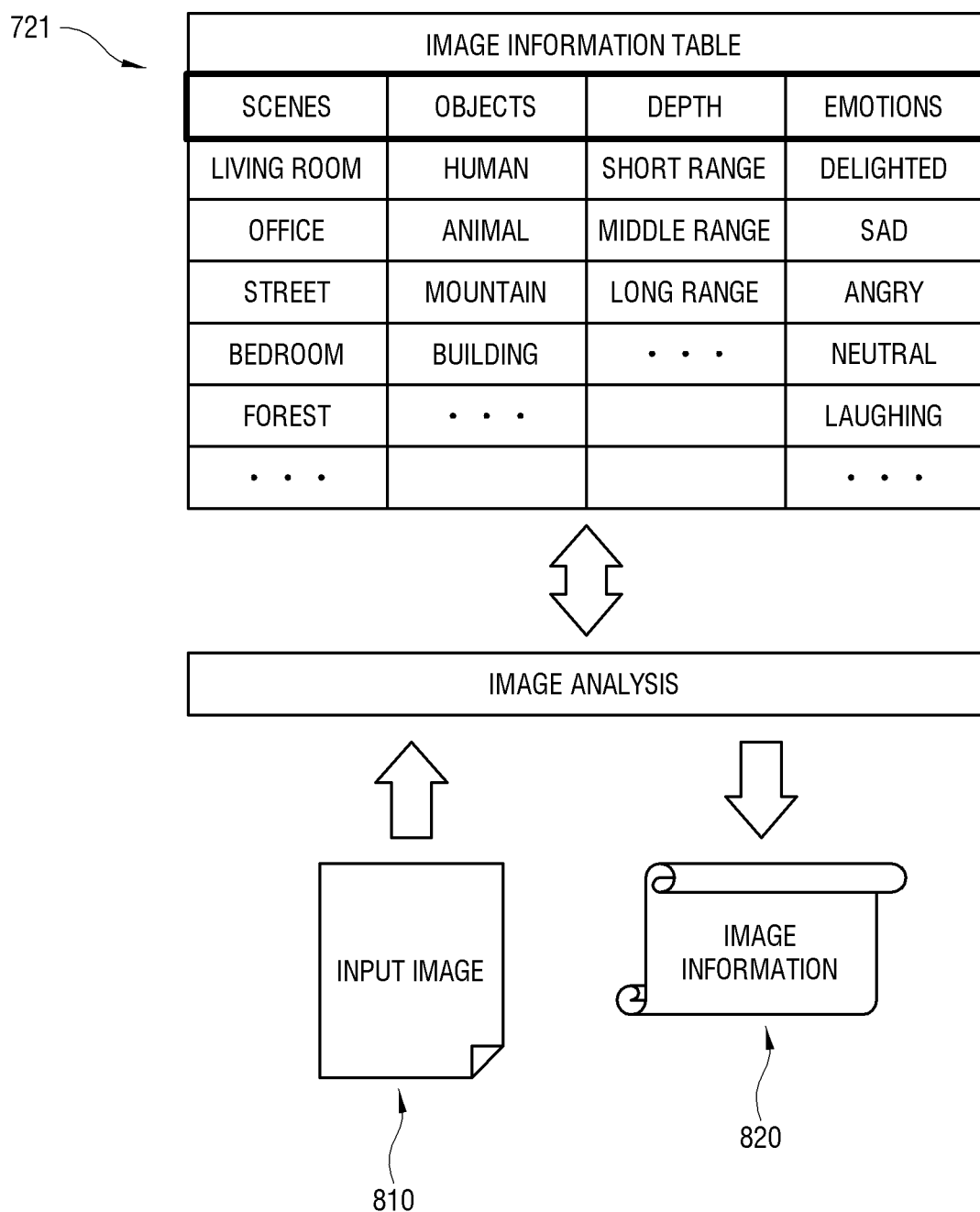
FIG. 8 illustrates an image information table to be referred to by an electronic apparatus according to an embodiment.

FIG. 8 illustrates an image information table to be referred to by an electronic apparatus.

As shown in FIG. 8, when an input image 810 is obtained, the electronic apparatus uses an image information table 721 to analyze the input image 810, thereby performing an image analysis for obtaining image information 820 about the input image 810.

In the image information table 721, a plurality of attribute items and the attribute values of the attribute items are tabulated. In an embodiment, the image information table 721 shows only very few data as compared with actual one. This is to make an embodiment concise. For example, the image information table 721 includes attribute items such as a scene corresponding to an overall background of an image, an object forming a background or foreground in the image, a depth corresponding to a relative distance to an object, an emotion corresponding to an emotional state of an object, e.g., of a human or an animal, etc. For example, the attribute item "scene" has attribute values a living room, an office, a street, a bedroom, a forest, etc., and the attribute item "object" has attribute values a human, an animal, a mountain, a building, etc. In this manner, each attribute item may be assigned a plurality of attribute values.

The electronic apparatus analyzes how the attribute items tabulated in the image information table 721 are displayed in the input image 810, and identifies the attribute values of the input image 810 with regard to the attribute items to thereby obtain image information 820. For the image analysis, one or more methods among various methods may be applied. For example, there may be applied a neural network model based on deep-learning of AI, a method of identifying an object by scanning the whole image, or a method of referring to metadata of an image. Besides, various methods may be used for analyzing an image.

The electronic apparatus analyzes the input image 810 to thereby identify various elements in content of the input image 810, i.e. items tabulated in the image information table 721. The electronic apparatus identifies the attribute values of the input image 810 among the plurality of attribute values provided in the identified items, and generates the image information 820 by combining the identified attribute values.

For example, it is be assumed the input image 810 in which a human plays with an animal in a forest, the human is relatively distant and the animal is relatively near, and the human and the animal are delighted. The electronic apparatus may generate the image information 820 corresponding to the input image 810 having content of "scene: forest, object: human, object: animal, depth: human-long range, depth: animal-short range, emotion: human-delighted, emotion: animal-delighted" based on the image information table 721. Such image information 820 is merely an example, and therefore an embodiment is not limited thereto.

As described in detail below, an electronic apparatus generates an output image by taking the attributes of an input image into account.

Figure 9:
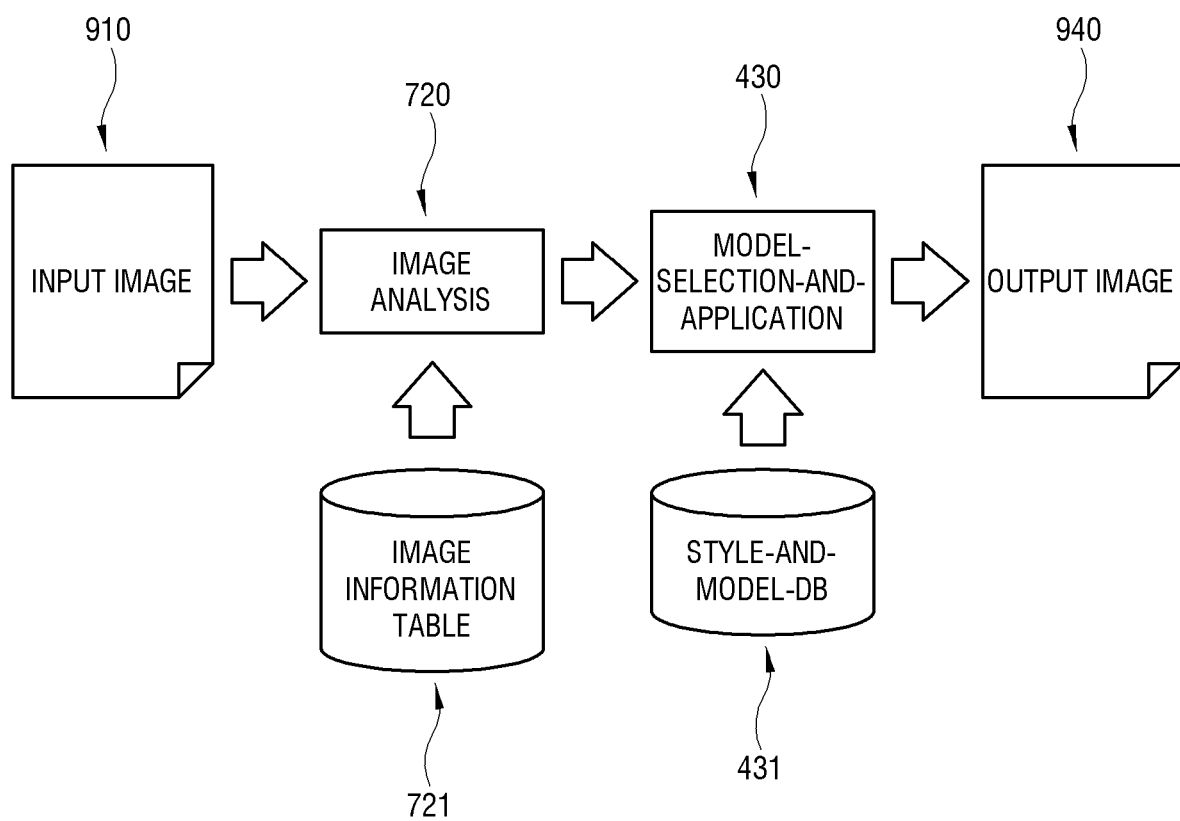
FIG. 9 illustrates schematic operations in a style transfer process of an electronic apparatus taking attributes of an input image into account according to an embodiment.

As shown in FIG. 9, when an input image 910 is identified, the electronic apparatus performs an image analysis 720 for analyzing image information corresponding to the attributes of the input image 910. When the image information corresponding to the input image 910 is obtained by the image analysis 720, the electronic apparatus performs a model-selection-and-application 430 based on the obtained image information. The electronic apparatus finally obtains an output image 940 through the model-selection-and-application 430.

The electronic apparatus uses an image information table 721 to obtain the image information. In the image information table 721, items related to a plurality of image attributes and a plurality of attribute values of the items are tabulated. The image information table 721 is substantially the same as described above, and thus detailed descriptions thereof will be avoided. In the image analysis 720, the electronic apparatus analyzes content forming the input image 910. The electronic apparatus uses the image information table 721 to obtain the image information about the content attributes of the input image 910.

According to an embodiment, a style-and-model-DB 431 includes styles and models corresponding to the image information. In the model-selection-and-application 430, the electronic apparatus obtains a style corresponding to the image information and a model corresponding to the obtained style from the style-and-model-DB 431.

The electronic apparatus transfers the style of the input image 910 based on the identified model corresponding to the style, thereby generating the output image 940.

In an embodiment, all of the processes may be carried out by the electronic apparatus, or some processes may be shared and performed by the server.

As described in detail below, the electronic apparatus selects a style and a model further corresponding to image information.

Figure 10:
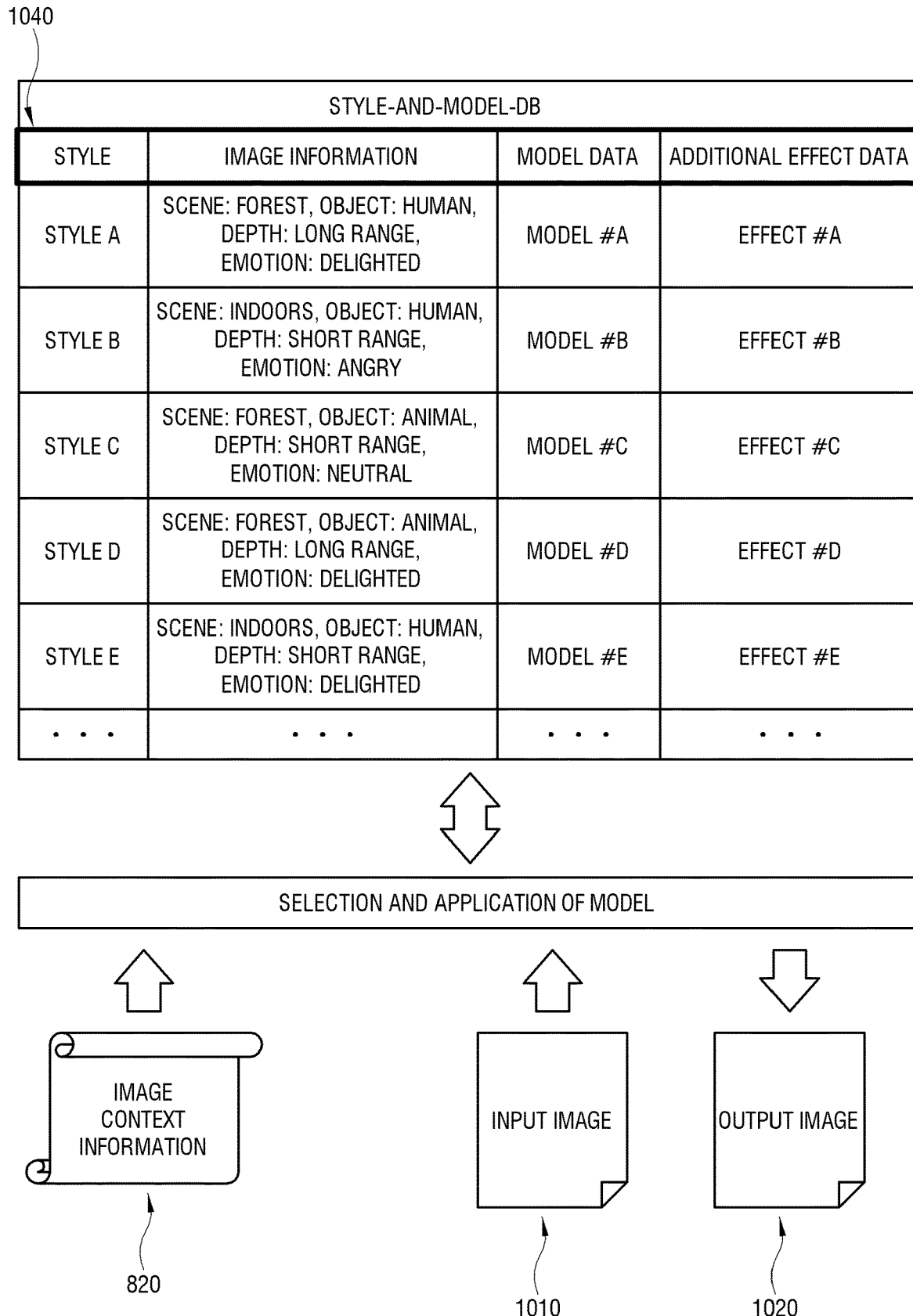
FIG. 10 illustrates a DB of styles and models to be referred to by an electronic apparatus according to an embodiment.

FIG. 10 illustrates a style-and-model-DB to be referred to by an electronic apparatus.

As shown in FIG. 10, a style-and-model-DB 1040 is configured to store a plurality of styles respectively corresponding to a plurality of pieces of image information, and model data corresponding to the styles. The style-and-model-DB 1040 may be configured to additionally store additional effect data corresponding to each style. The additional effect data corresponding to the style is not essential, and might not be prepared according to the styles.

The electronic apparatus identifies the style corresponding to image information 820 from the style-and-model-DB 1040, and obtains the model data and the additional effect data corresponding to the identified style. The electronic apparatus converts an input image 1010 into an output image 1020 based on the obtained model data, or the obtained model data and additional effect data.

The model data may be an AI model previously generated by learning, which is designed to be optimized to image information. For example, it may be taken into account that image information corresponding to a style A shows "scene: forest, object: human, depth: long range, emotion: delighted", and image information corresponding to a style B shows "scene: indoors, object: human, depth: short range, emotion: angry." As compared with an indoor place, a forest place is emphasized in natural color rather than artificial color. For example, in summer, greenish color dominates the forest place. When a focus is provided onto a person in the same place, the person in a short range may need to be more emphasized in bright color than the person in a long range. Although the person is in the same place and the same range, a relatively bright color is provided to a delighted person, or a relatively dark color may be provided to an angry person, to emphasize the emotion or the mood. Each model is designed to take this point into account.

The method of designing and realizing the model corresponding to the style is based on an AI-based learning model, and therefore detailed descriptions thereof will be omitted.

The electronic apparatus according to an embodiment can automatically select a model corresponding to the input image 1010 based on the style-and-model-DB 1040, and generate the output image 1020 based on the selected model.

The operations of the apparatus described in embodiments may be performed by artificial intelligence provided in the corresponding apparatus. The artificial intelligence may be applied to various general systems by utilizing a machine learning algorithm. An artificial intelligence system may be a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

The linguistic comprehension refers to technology of recognizing, applying and processing a human language or text, and includes natural language processing, machine translation, conversation system, question and answer, voice recognition and synthesis, etc.

Inference and prediction refer to technology of identifying information and logically making prediction, and includes knowledge-based and/or probability-based inference, optimized prediction, preference-based plan, recommendation, etc.

Knowledge representation refers to technology of automating a human experience information into knowledge data, and includes knowledge building such as data creation and classification, knowledge management such as data utilization, etc.

The methods according to embodiments may be implemented by executing a program instruction that can be implemented in various computers, and recorded in a computer-readable medium. Such a computer-readable medium may include a program instruction, a data file, a data structure or the like, or combination thereof. For example, software (e.g., the program) containing one or more instructions may be stored in a machine-readable (e.g., computer-readable) storage medium (e.g., internal memory) or external memory.

For example, the computer-readable medium may be a nonvolatile storage such as an USB memory, for example, a RAM, a ROM, a flash memory, a memory chip, an integrated circuit (IC) or the like memory, or an optically or magnetically recordable or machine (e.g., a computer)-readable storage medium, for example, a compact disc (CD), a digital versatile disc (DVD), a magnetic disc, a magnetic tape or the like. It will be appreciated that a memory, which can be included in the electronic apparatus 110, the server 120, and/or another external apparatus, is an example of the machine-readable storage medium suitable for storing a program having instructions for realizing embodiments. The program instruction recorded in this storage medium may be specifically designed and configured according to embodiments, or may be known to those skilled in the art. Further, the computer program instruction may be implemented by a computer program product.

While embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A display apparatus comprising:
a display; and
a processor configured to:
obtain a first image and first information on the first image, wherein the first information includes a plurality of attributes of the first image,
obtain second information related to a use environment of the display apparatus, wherein the second information includes a plurality of attributes of the use environment,
identify a first context information related to a first attribute from among the plurality of attributes of the use environment, the first attribute corresponding to the use environment of a current point in time,
identify a second context information related to a second attribute from among the plurality of attributes of the first image, the second attribute corresponding to the first context information,
identify a style among a plurality of styles which are applicable to the first image, based on the identified second context information,
obtain a second image, which is converted from the first image based on information related to the identified style, and
control the display to display the second image,
wherein the first context information includes information on at least one of place attributes, user attributes and surrounding environment attributes of the display apparatus.

2. The display apparatus according to claim 1, wherein the information related to the identified style comprises an artificial neural network model based on deep learning.

3. The display apparatus according to claim 2, wherein the processor is further configured to convert the first image based on a model corresponding to the identified style among a plurality of models respectively corresponding to the plurality of styles.

4. The display apparatus according to claim 1, wherein the second information related to the use environment comprises information on at least one of a use time, a use place, a use history, or a surrounding environment, of the display apparatus.

5. The display apparatus according to claim 1, wherein the processor is further configured to process the second information related to the use environment based on a look-up table in which attribute values are defined corresponding to a plurality of attribute items related to the use environment of the display apparatus.

6. The display apparatus according to claim 1, wherein the processor is further configured to:
- identify a second style based on information related to the plurality of attributes of the first image among the plurality of styles, and
- convert the first image based on the information related to the style and information related to the second style.

7. The display apparatus according to claim 6, wherein the processor is further configured to process the information related to the plurality of attributes of the first image based on a look-up table in which attribute values are defined in correspondence to a plurality of attribute items related to an image.

8. The display apparatus according to claim 6, wherein the information related to the plurality of attributes of the first image comprises information related to an object in the first image.

9. The display apparatus according to claim 1, further comprising a communication circuit configured to communicate with a server,
- wherein the processor is further configured to:
  - transmit the second information related to the use environment and the first image to the server through the communication circuit, and
  - obtain information related to the second image, which is converted by the server, from the server through the communication circuit.

10. The display apparatus according to claim 1, wherein the identified style comprises at least one of a hue of the first image, a saturation of the first image, a brightness of the first image, a contrast of the first image, an edge type for an object in the first image, or a texture type applied to the object.

11. A method of controlling a display apparatus, the method comprising:
- obtaining, via a processor of the display apparatus, a first image and first information on the first image, wherein the first information includes a plurality of attributes of the first image;
- obtaining, via the processor, second information related to a use environment of the display apparatus, wherein the second information includes a plurality of attributes of the use environment;
- identifying, via the processor, a first context information related to a first attribute from among the plurality of attributes of the use environment, the first attribute corresponding to the use environment of a current point in time;
- identifying, via the processor, a second context information related to a second attribute from among the plurality of attributes of the first image, the second attribute corresponding to the first context information;
- identifying, via the processor, a style among a plurality of styles which are applicable to the first image, based on the identified second context information;
- obtaining a second image, which is converted from the first image based on information related to the identified style; and
- displaying, on a display of the display apparatus, the second image,.
- wherein the first context information includes information on at least one of place attributes, user attributes and surrounding environment attributes of the display apparatus.

12. The method according to claim 11, wherein the information related to the identified style comprises an artificial neural network model based on deep learning.

13. The method according to claim 12, wherein the obtaining the second image further comprises converting the first image based on a model corresponding to the identified style among a plurality of models respectively corresponding to the plurality of styles.

14. The method according to claim 11, wherein the second information related to the use environment comprises information on at least one of a use time, a use place, a use history, or a surrounding environment, of the display apparatus.

15. The method according to claim 11, wherein the identifying the style further comprises processing the second information related to the use environment based on a look-up table in which attribute values are defined corresponding to a plurality of attribute items related to the use environment of the display apparatus.

16. The method according to claim 11, further comprising:
- identifying a second style based on information related to the plurality of attributes of the first image among the plurality of styles,
- wherein the obtaining the second image further comprises converting the first image based on the information related to the style and information related to the second style.

17. The method according to claim 16, further comprising processing the information related to the plurality of attributes of the first image based on a look-up table in which attribute values are defined in correspondence to a plurality of attribute items related to an image.

18. The method according to claim 16, wherein the information related to the plurality of attributes of the first image comprises information related to an object in the first image.

19. The method according to claim 11, further comprising:
- transmitting the first information related to the first image to a server; and
- obtaining information related to the second image, which is converted by the server, from the server.

20. The method according to claim 11, wherein the identified style comprises at least one of a hue of the first image, a saturation of the first image, a brightness of the first image, a contrast of the first image, an edge type for an object in the first image, or a texture type applied to the object.

* * * * *